United States Patent
Novikov et al.

(10) Patent No.: US 12,462,337 B2
(45) Date of Patent: Nov. 4, 2025

(54) SYSTEM, DEVICES AND/OR PROCESSES FOR PROCESSING IMAGE PIXEL VALUES

(71) Applicant: Arm Limited, Cambridge (GB)

(72) Inventors: Maxim Novikov, Manchester (GB); David Hanwell, Sale (GB); Puneet Singh Matharu, Manchester (GB)

(73) Assignee: Arm Limited, Cambridge (GB)

( * ) Notice: Subject to any disclaimer, the term of this patent is extended or adjusted under 35 U.S.C. 154(b) by 870 days.

(21) Appl. No.: 17/681,533

(22) Filed: Feb. 25, 2022

(65) Prior Publication Data

US 2023/0281752 A1 Sep. 7, 2023

(51) Int. Cl.
| | |
|---|---|
| G06T 3/4007 | (2024.01) |
| G06N 3/084 | (2023.01) |
| G06T 3/4046 | (2024.01) |
| G06T 5/50 | (2006.01) |

(52) U.S. Cl.
CPC ........... *G06T 3/4007* (2013.01); *G06N 3/084* (2013.01); *G06T 3/4046* (2013.01); *G06T 5/50* (2013.01); *G06T 2207/20212* (2013.01)

(58) Field of Classification Search
CPC ....... G06T 3/4007; G06T 3/4046; G06T 5/50; G06T 2207/20212; G06T 3/4015; G06N 3/084; G06N 3/0464; G06N 3/08
See application file for complete search history.

(56) References Cited

U.S. PATENT DOCUMENTS

| | | | |
|---|---|---|---|
| 2005/0025378 A1* | 2/2005 | Maurer | G06T 5/70 382/260 |
| 2010/0253817 A1* | 10/2010 | Ali | G06T 3/4015 382/167 |
| 2020/0012940 A1* | 1/2020 | Liu | H04N 7/0135 |
| 2020/0293857 A1* | 9/2020 | Nakadai | G06N 20/10 |
| 2021/0142448 A1* | 5/2021 | Yao | G06N 3/044 |
| 2022/0207656 A1* | 6/2022 | Yao | G06N 20/10 |
| 2022/0284545 A1* | 9/2022 | Ahn | G06N 3/08 |
| 2023/0116000 A1* | 4/2023 | Novikov | H04N 25/134 348/273 |
| 2024/0029420 A1* | 1/2024 | O'Neil | G06V 10/454 |

OTHER PUBLICATIONS

Mildenhall, et al, "Burst Denoising with Kernel Prediction Networks," this CVPR paper is the Open Access version, provided but the Computer Vision Foundation, except for watermark, it is identical to the version available on IEEE Xplore, 2018, 9 pages.
Shi, et al, "Real-Time Single Image and Video Super-Resolution Using an Efficient Sub-Pixel Convolutional Neural Network," arXiv:1609.05158v2 [cs.CV], Sep. 23, 2016, 10 pages.

* cited by examiner

*Primary Examiner* — Charles T Shedrick
(74) *Attorney, Agent, or Firm* — Berkeley Law & Technology Group, LLP

(57) ABSTRACT

Example methods, apparatuses, and/or articles of manufacture are disclosed that may be implemented, in whole or in part, techniques to process pixel values sampled from a multi color channel imaging device. In particular, methods and/or techniques to process pixel samples for interpolating pixel values for one or more color channels.

20 Claims, 9 Drawing Sheets

SYSTEM, DEVICES AND/OR PROCESSES FOR PROCESSING IMAGE PIXEL VALUES

BACKGROUND

1. Field

The present disclosure relates generally to image processing devices.

2. Information

Images represented as arrays of multi-color pixels (e.g., red, green and blue pixels) may be processed using a convolution operation in which a kernel is applied to impart an intended effect such as to improve accuracy in a reproduced image. In one implementation, coefficients in such a kernel may be derived by operation of a trained convolutional neural network such as implemented in a kernel prediction network (KPN). Application of such kernel coefficients derived by a KPN may have limited effect in improving accuracy of a reproduced image.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIG. 1A is a schematic diagram of an imaging device that defines four color channels including an infrared channel according to an embodiment;

FIG. 1B is a schematic diagram of an imaging device that defines three color channels in a so-called Bayer, according to an embodiment;

Figure 2A:
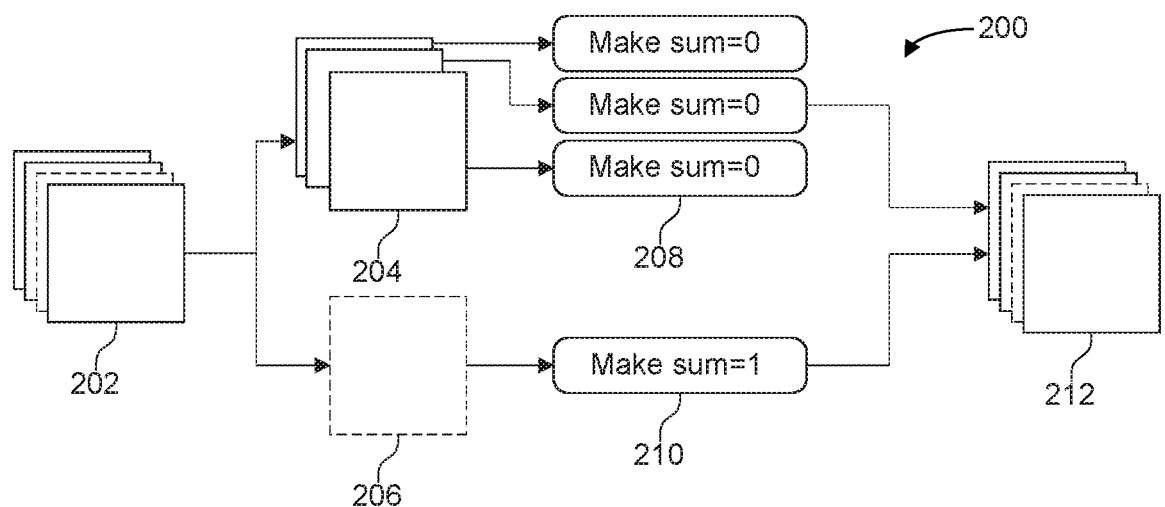
FIGS. 2A and 2B are systems to at least in part implement a machine-learning process, according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

Data-driven approaches, and a combination of classical and data-driven approaches, are increasingly being applied in interpolation and super-resolution methods to process image pixel values (e.g., obtained from an imaging array). Such methods to process image signals in one color channel may rely on pixel values for particular operations such as interpolation of pixel values. Use of inter-channel correlation may enable higher resolution and improved perceptual quality. As a machine-learning process commences, accuracy of interpolation operations may not be high. Color accuracy of interpolation operations may gradually improve as machine-learning proceeds. Nonetheless, colour accuracy may be a function of input data and particular machine-learning training methodology, and is generally not guaranteed even after machine-learning models convergence. Errors may be relatively small, but still greater than machine precision. Conventional convolutional neural networks (CNNs) may also fall short if processing new scenes or previously unseen colour combinations, even if colour accuracy is acceptable on applied training data.

Figures 1A, 1B:
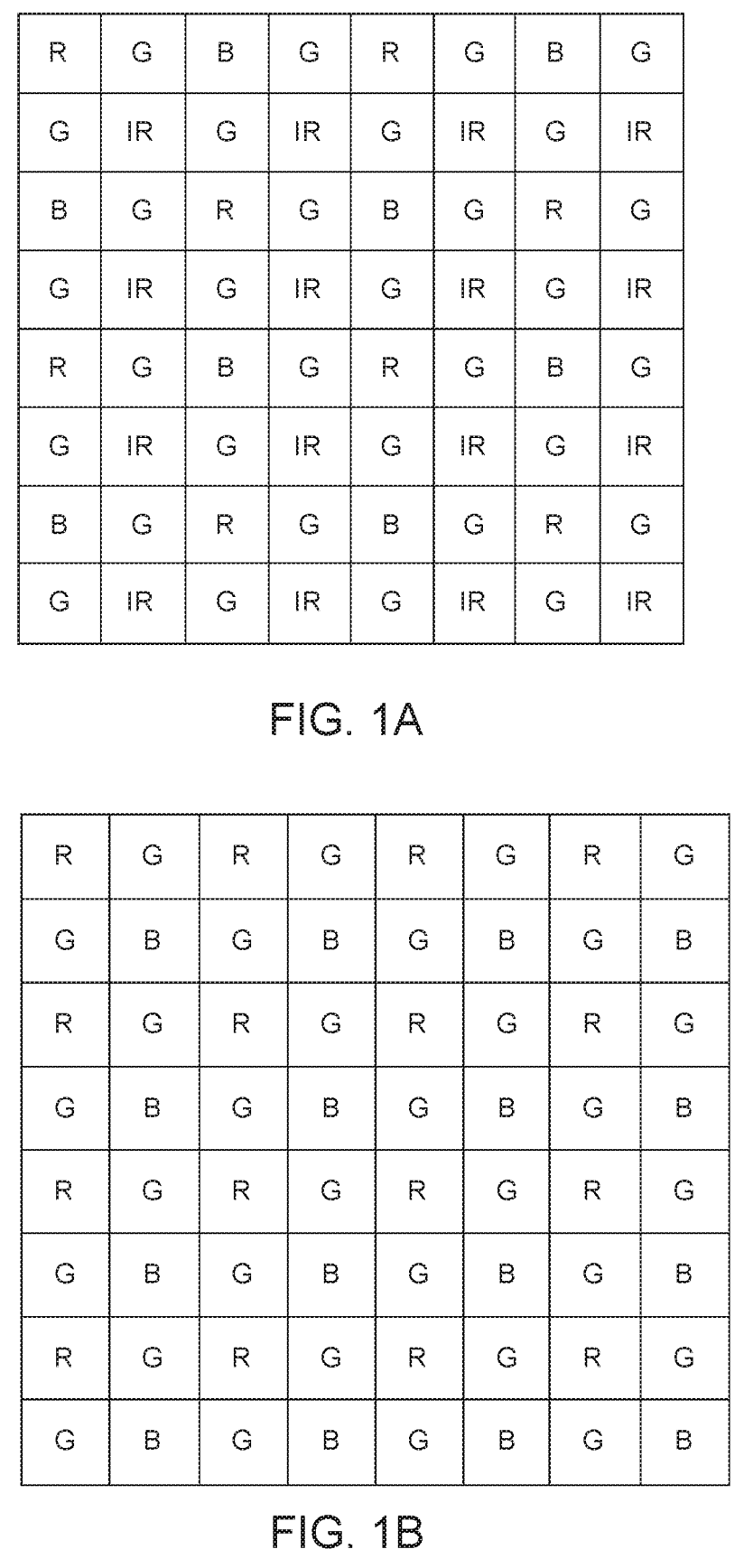

Briefly, according to an embodiment coefficients for implementing a kernel to be applied to pixel values for interpolation of pixel values may be derived, at least in part, from machine learning operations applied to a neural network (NN). In this context, a "kernel" as referred to herein means a set of organized parameters of a convolution operation to be applied to one or more image signal values expressing an image, such as color intensity values associated with pixel locations in the image, to impart a particular intended effect to the image. Such an intended effect may comprise, for example, blurring, sharpening, embossing, feature detection/extraction (e.g., edge detection), just to provide a few examples. In particular applications, convolution operations applying such a kernel may improve accuracy in interpolating pixel values for particular color channels. In some implementations, an image signal processor (ISP) may be designed to process signals in 2×2 repeating patterns—such as the 2×2 RGGB Bayer pattern (e.g., as shown in FIG. 1B) and 2×2 RGBIr patterns (e.g., as shown in FIG. 1A). In other implementations, an ISP may process signals provided by mosaic arrays of different patterns such as, for example, a 4×4 RGBIr pattern. Imaging devices formed in integrated circuit devices may include a substrate formed as a complementary metal oxide semiconductor (CMOS) device having formed thereon an array of photodiodes that are responsive to impinging light energy. In one embodiment as shown in FIG. 1B, light filters or "masks" may be formed over such photodiodes to form red, blue and green pixels of a so-called Bayer pattern pixel array. In an embodiment, energy collected at such photodiodes may be sampled as voltage and/or current samples that express and/or represent an intensity of light of particular color frequency bands at particular pixel locations over an exposure interval (e.g., frame).

According to an embodiment, reproduction of an image captured at a multi-color channel mosaic imaging device may entail interpolation of image pixel values for a particular color channel at pixel locations in which no particular sampled pixel value was obtained for the particular color channel. For example, a red pixel value at a particular pixel location may be interpolated based, at least in part, on red pixel values obtained for nearby pixel locations. Additionally, such an interpolated red pixel value may be further based, at least in part, on inter-color interpolation (e.g., further based on blue, green and/or infrared pixel values obtained for nearby pixel locations).

Figure 2B:
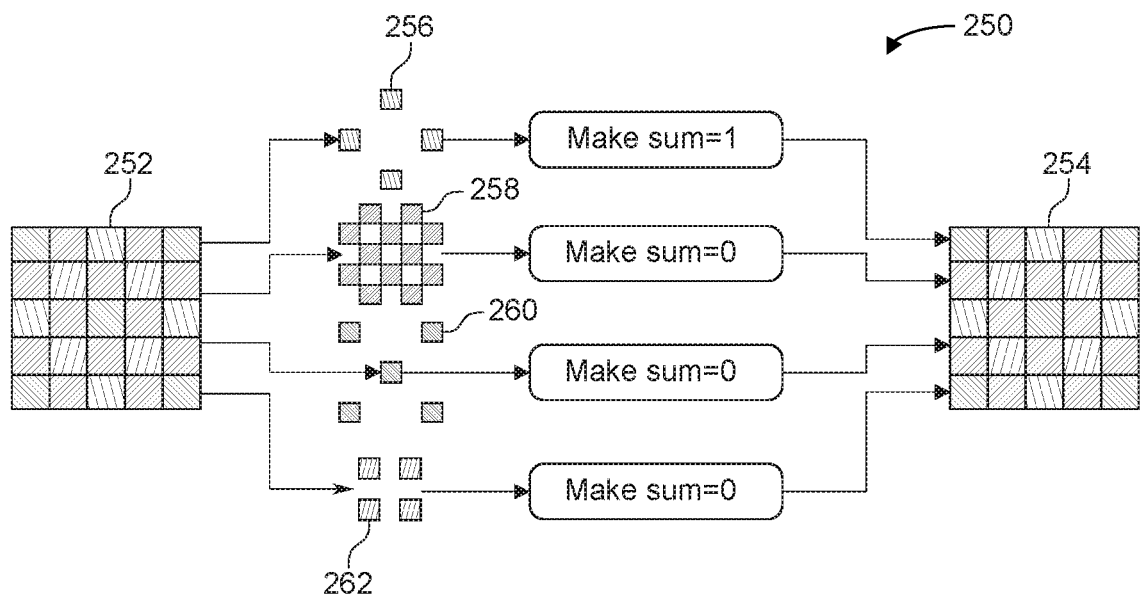

According to an embodiment, techniques to obtain interpolated pixel values in a reproduced image may employ a measurement/observation-driven approach to enhance accuracy and/or resolution. For example, filter parameters employed in pixel interpolation may be defined in part using machine learning that employs one or more convolutional neural networks (CNNs). According to an embodiment, such a CNN may comprise nodes, edges connecting nodes and weights associated with such edges configured to provide one or more filter paths to, for example, perform operations such as classification, detection of features of interest, estimating a depth of a map, tracking objects, just to provide a few examples. According to an embodiment such a CNN may be trained in a machine learning process using training sets comprising image pixel values according to a particular mosaic format. In the course of such a machine learning process, back-propagation gradients may "flow" backward and/or upstream from an output (e.g., "prediction" values) to the input values to, for example, iteratively tune weights associated with edges in a CNN. In an implementation, while initial epochs of a process to train a CNN process may predict inaccurate colors, subsequent epochs may gradually improve color prediction accuracy. According to an embodiment, a particular level of color accuracy may be established as a design goal and interpolation quality/edge sharpness is changed. As illustrated in FIGS. 2A and 2B, this may be achieved at least in part by application of an interpolation kernel 202 to convolve a multi color channel array of pixel values. In a particular implementation, kernel 202 may comprise a linear combination of "subplanes" associated with different color channels to be interpolated. In an embodiment, a subplane associated with a particular color channel of a multicolor channel mosaiced pixel values include coefficients to be applied to pixel values of the particular color channel. According to an embodiment, coefficients of an individual plane of planes 204 of interpolation kernel 202 may be set such that the coefficients sum to a null value such as zero while a sum of coefficients of a plane 206 of a current channel is forced to be a unity value such as one.

As shown in FIG. 2B, subplanes 256, 258, 260 and 262 of a kernel 252 may be associated with and/or employed to express different color channels of kernel 252 (e.g., red, blue, green and/or infrared). In an embodiment, a subplane 256, 258, 260 or 262 may be independently extracted and normalized such that a sum of associated coefficients equals a unit value (e.g., one) or a null value (e.g., zero), depending on an output channel. A particular subplane (e.g., a particular subplane 256, 258, 260 or 262) may be normalized such that the sum of coefficients of the particular subplane equals one or zero. In the particular example of FIG. 2B, a 5×5 kernel may be applied to pixel values provided in a 4×4 format to compute pixel values of a red channel, for example.

According to an embodiment, coefficients of a sub-plane 256, 258, 260 or 262 may be normalized (such that coefficients of a subplane sum to a unity value or a null value) using any one of several techniques. If coefficients of a particular sub-plane are to be normalized to a unit value and/or one (e.g., if the particular sub-plane is associated with an output channel), coefficients may be normalized to sum to a unit value and/or one according to expression (1) as follows:

$$\theta_{l,j} = \frac{c_{l,j}}{\sum_{i=1}^{i=I} c_{i,j}}, \tag{1}$$

where:
$C_{l,j}$ is a value of the lth unnormalized coefficient in the jth sub-plane of a kernel;
$\theta_{l,j}$ is a value of the lth normalized coefficient in the jth sub-plane of the kernel; and
I is the number of coefficients in the jth sub-plane of the kernel.

If coefficients of a particular sub-plane are to be normalized to a null value and/or zero (e.g., if the particular sub-plane is not associated with an output channel), coefficients may be normalized to sum to a null value and/or zero according to expression (2) as follows:

$$\theta_{l,j} = c_{l,j} - \frac{\sum_{i=1}^{i=I} c_{i,j}}{I}, \tag{2}$$

where:
$C_{l,j}$ is a value of the lth unnormalized coefficient in the jth sub-plane of a kernel;
$\theta_{l,j}$ is a value of the lth normalized coefficient in the jth sub-plane of the kernel; and
I is the number of coefficients in the jth sub-plane of the kernel.

According to an embodiment, kernel coefficients may be normalized according to expressions every time before convolution is applied in an iteration of a CNN in a training epoch. For example, kernel coefficients may be re-normalized according to expressions (1) or (2) at each iteration and/or training epoch. Once training is completed, coefficients may be normalized before storing for application in inference operations.

Figure 3:
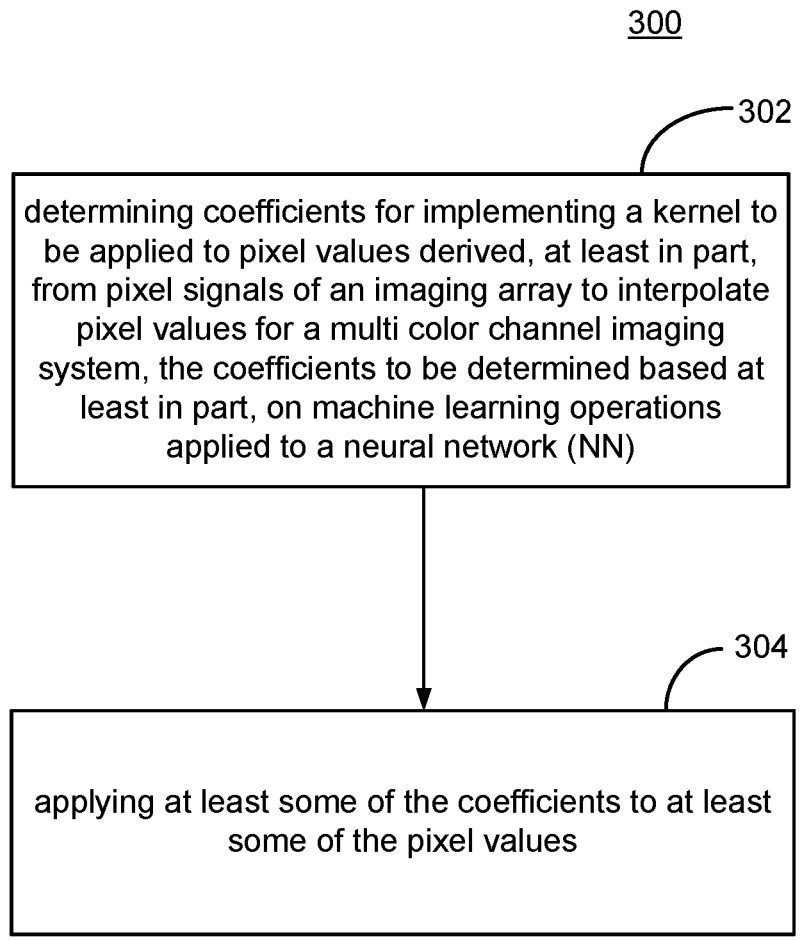
FIG. 3 is a flow diagram of a process to determine coefficients for a kernel to be applied to image pixel values, according to an embodiment.

FIG. 3 is a flow diagram of a process 300 of determining kernel coefficients to be applicable in interpolation of pixel values for a multi-color channel imaging system, according to an embodiment. Block 302 may comprise application of training sets to train a neural network (NN) in a machine-learning process. As pointed out above, in the course of such a machine-learning process, back-propagation gradients may "flow" backward and/or upstream from prediction values. Block 302 may iteratively tune weighs associated with edges of the NN over the course of training epochs. Block 304 may then apply kernel coefficients to image pixel values to, for example, impart an intended effect such as a performing an interpolation of pixel values.

According to an embodiment, block 302 may determine coefficients of a kernel that is separable into sub-planes as discussed above where coefficients of a sub-plane are to be applied to pixel values of a color channel corresponding with the sub-plane. In a particular implementation, in the course of training epochs to tune weights associated with edges in an NN, block 302 may constrain weights such that kernel weights to be derived are normalized. For example, operations of block 302 may constrain resulting coefficients of a kernel sub-plane to be normalized such that coefficients of the sub-plane sum to a null value (e.g., zero) or sum to a unity value (e.g., one) as described above.

Figure 4:
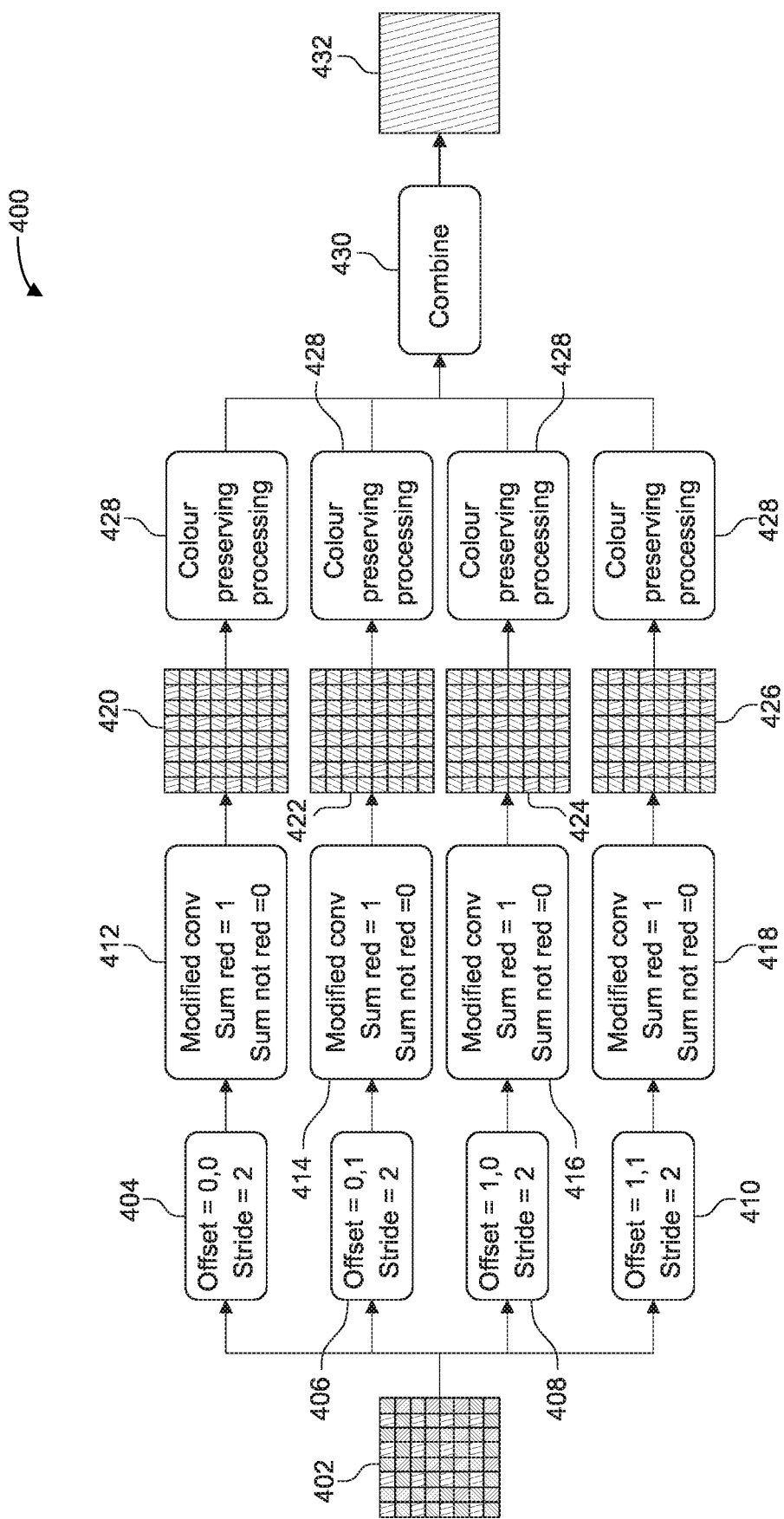
FIG. 4 is a schematic diagram of a system to perform to process a multi-color pixel values generated from a mosaic imaging array, according to an embodiment.

According to an embodiment, block 304 may apply kernel coefficients in any one of several different operations to process image pixel values, such as operations that entail color interpolation. In this context, a "pixel value" as referred to herein means a value and/or parameter that represents an intensity level associated with a particular location of a pixel in an image. Such a pixel value may be associated with a particular light channel such as, for example, infrared light or visible light (e.g., red, blue or green light). In a particular implementation, a pixel value associated with a particular light channel may be expressed in a particular vector and/or data structure along with other pixel values associated with a particular pixel location in an image. One such operation may be executed by system 400 shown in FIG. 4 to apply a demosaic effect to pixel values 402 (e.g., in a Bayer pattern) providing pixel values 432 for a particular color channel in each pixel location of an image frame. In the particular illustrated embodiment, pixel values 432 are for a red color channel. It should be understood, however, that features of system 400 may be similarly applied to generate pixel values at each pixel location of an image frame for a different color channel. Blocks 406, 408 and 410 may each apply a spatial shift to pixel values 402 by one pixel location while block 404 does not apply any such spatial shift. It should be understood, however, that in particular implementations an amount of shift may depend on a starting position within a pattern. It should also be understood that particular distinct features of FIG. 4 may be implemented and/or executed by the same and/or common hardware elements. For example, features of blocks 404, 412 and 428 may be implemented and/or executed by the same and/or common hardware element(s) tailored with different control parameters. Blocks 412, 414, 416 and 418 may apply kernel coefficients to pixel values generated by blocks 404, 406, 408 and 410 (including spatially shifted pixel values generated by blocks 406, 408 and 410). According to an embodiment, kernel coefficients applied at blocks 404, 406, 408 and 410 may be determined according to operations performed at block 302 (FIG. 3) based on back-propagation from machine-learning operations. Additionally, such kernel coefficients applied at blocks 404, 406, 408 and 410 may be separable into sub-planes such that coefficients of a sub-plane corresponding with a red color channel sum to a unity value (e.g., one) and coefficients of sub-planes corresponding with different color channel sum to a null value (e.g., zero). Additional color-preserving processing may be applied at blocks 428 to, for example, apply convolutional neural network based processing with modified convolutions in which coefficients are subject to normalization (e.g., coefficients of one sub-plane sum to unity value and coefficients of other sub-planes sum to null value). Processed pixel values generated by blocks 428 may then be spatially combined at block 430 to generate pixel values 432.

In another implementation, block 304 may apply kernel coefficients in a network filter as shown in example implementations of FIGS. 5 through 9. Implementations of FIGS. 5 through 9 show particular "layers" of processing particular numbers of filters and particular numbers of color channels. It should be understood, however, that these are merely example of filter networks presented to illustrated features of particular embodiments, and that other networks of filters may have more or fewer processing layers, and/or more or fewer color channels without deviating from claimed subject matter.

Figure 5:
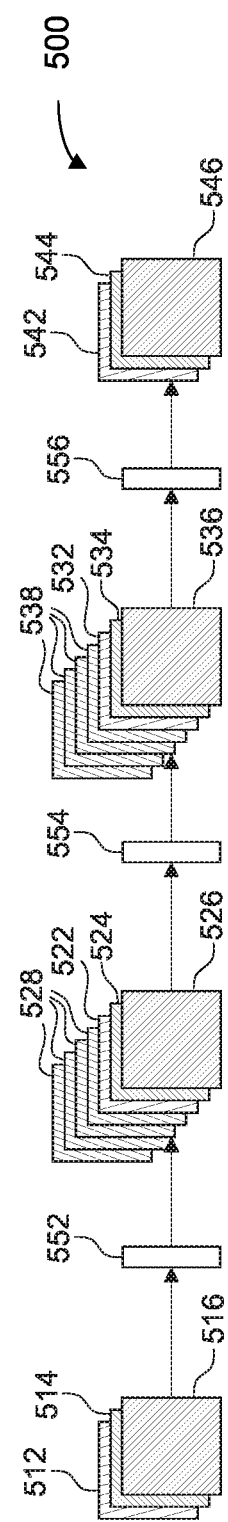
FIGS. 5 through 9 are schematic diagrams of systems to implement processing layers to process image pixel values, according to alternative embodiments.

System 500 shown in FIG. 5 is directed to a super-resolution network of filters. According to an embodiment, system 500 may define one or more filter paths to detect and/or classify image features other than pixel values for color channels. For example, processing stages 552 and 554 may provide intermediate outputs 528 and 538 having "feature maps" identifying image edges, specific texture elements, higher-level semantic features and/or more abstract information in deeper filter networks. In some implementations, such features in a feature map may be human interpretable. In other implementations, such features in a feature map may not be human-interpretable. In a particular implementation, outputs 528 and/or 538 may provide learned feature maps that may not be representative of colour, but have semantic information, in combination with a colour-preserving path. In the presently illustrated embodiment, system 500 may process sets of pixel values 512, 514 and 516 for red, green and blue color channels, respectively. Here, pixel values 512, 514 and 516 may each include a pixel value for a corresponding color channel at each pixel location in an image frame. It should be understood that particular processing stages and feature layers in system 500 as shown are merely examples provided for the purpose of illustration, and that other implementations may include greater or fewer processing stages and/or feature layers without deviating from claimed subject matter. Also, while the particular example of FIG. 5 processes pixel values in red, green and blue color, it should be understood that similar processing may be applied to pixel values defined according to different colour spaces and a different number of channels. For example, feature of system 500 may be applied to processing pixel values in a Y channel of a YUV image, with U and V components processed separately.

According to an embodiment, system 500 may implement multiple processing stages including a first processing stage 552 to transform pixel values 512, 514 and 516, to red pixel values 522, green pixel values 524 and blue pixel values 526, followed by a second processing stage 554 to transform pixel values 522, 524 and 526, to red pixel values 532, green pixel values 534 and blue pixel values 536, and followed by a third processing stage 556 to transform pixel values 532, 534 and 546, to red pixel values 542, green pixel values 544 and blue pixel values 546. In an implementation, first, second and third processing stages 552, 554 and 556 may each apply coefficients of an associated kernel to implement filter paths to generate red, green and blue pixel values.

In addition to transforming pixel values for red, green and blue color channels, application of kernel coefficients at first, second and third processing stages 552, 554 and 556 may also implement filter paths to detect and/or classify image features such as features 528 and/or features 538. Additionally, such kernel coefficients applied at first, second and third processing stages 552, 554 and 556 may be determined, at least in part, by processing at block 302 (FIG. 3). In a particular implementation, such an implementation of block 302 may determine kernel coefficients applied at first, second and third processing stages 552, 554 and 556 based, at least in part, on observations to train the one or more filter paths to detect and/or classify the image features other than pixel values for color channels.

Figure 6:
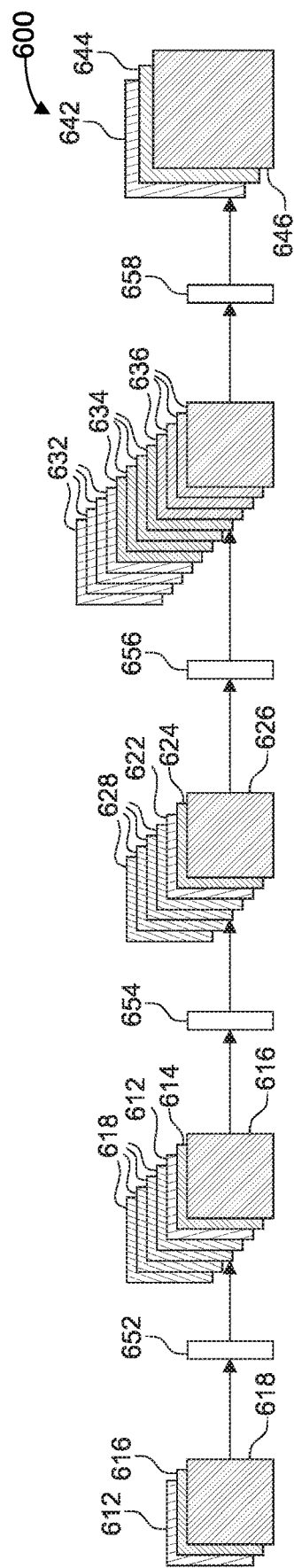

According to an embodiment, system 600 of FIG. 6 may implement multiple processing stages to transform pixel values 612 (for a red color channel), 614 (for a green color channel) and 616 (for a blue color channel) of an image at a first resolution to an upscaled image having a second, higher resolution expressed by pixel values 642 (for the red color channel), 644 (for the green color channel) and 616 (for the blue color channel). In a particular implementation, processing stages 652, 654 and 656 may determine "feature maps" identifying image edges, specific texture elements, higher-level semantic features and/or more abstract information in deeper filter networks. Processing stage 658 may implement a Pixelshuffle operation to generate pixel values 642, 644 and 646 at a resolution that is higher than the first resolution (of pixel values 612, 614 and 616).

Figure 7:
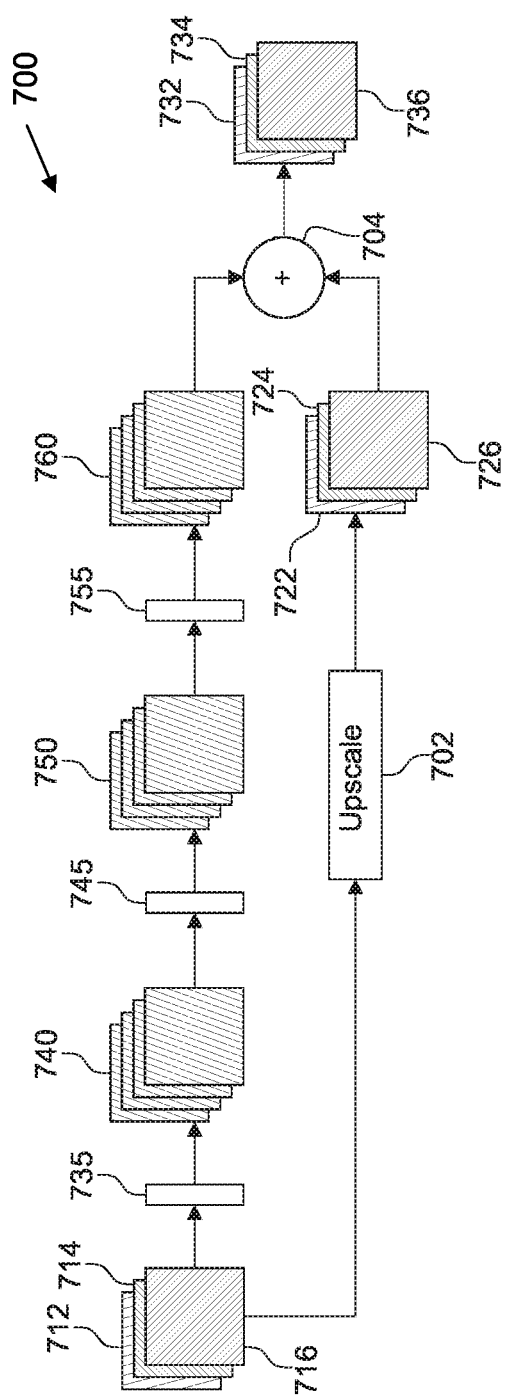

According to an embodiment, system 700 of FIG. 7 may implement multiple processing stages to transform pixel values 712 (for a red color channel), 714 (for a green color channel) and 716 (for a blue color channel) of an image at a first resolution to an upscaled image having a second, higher resolution expressed by pixel values 732 (for the red color channel), 734 (for the green color channel) and 736 (for the blue color channel). For example, upscale operation 702 may transform pixel values 712, 714 and 716 (e.g., using a PixelShuffle operation) to pixel values 722, 724 and 726 to express a higher resolution image (e.g., using a PixelShuffle operation). Processing stages 735, 745 and 755 may process pixel values 712, 714 and 716 to generate features 760. According to an embodiment, processing stages 735, 745 and 755 may collectively implement a high pass filter such that an output may be fully attenuated below a particular frequency. Features 760 may then be additively combined with upscaled pixel values 722, 724 and 726 at processing stage 704 to produce pixel values 732, 734 and 736 for an output image frame. According to an embodiment, processing stages 702, 735, 745 and/or 755 may be implemented by application of kernel coefficients. Such kernel coefficients to be applied at processing stages 702, 735, 745 and/or 755 may be determined, at least in part, according to block 302 (FIG. 3) discussed above.

Figure 8:
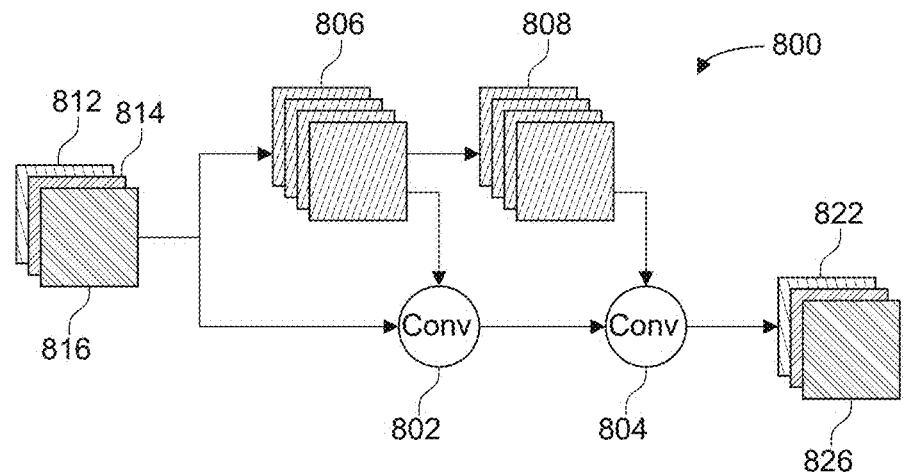
Figure 9:
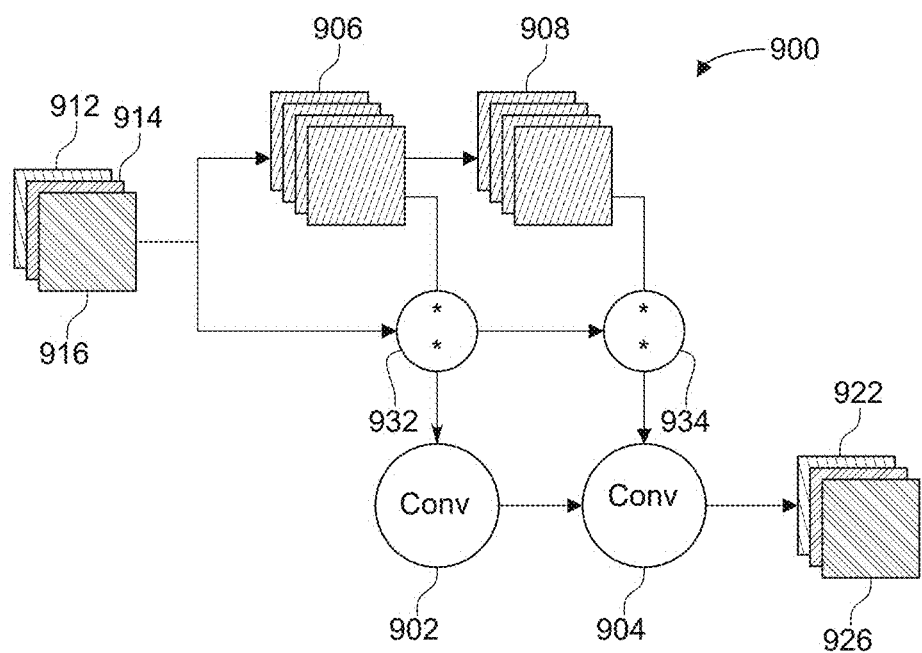

Systems 800 and 900 in FIGS. 8 and 9 may implement kernel prediction networks according to alternative implementations. Processing stages 852 and 854 may determine kernel coefficients 806 and 808 to be applied by convolution stages 802 and 804, respectively, to red pixel values 812, blue pixel values 814 and green pixel values 815. For example, processing stages 852 and 854 may determine sets of kernel coefficients 806 and 808 using a machine-learning process executed by one or more neural networks based, at least in part, on training sets and/or ground truth observations. In a particular implementation, processing stages 852 and/or 854 may determine kernel coefficients according to processing at block 302 (FIG. 3) discussed above. Convolution stages 802 and 804 may apply kernel coefficients 806 and 808 in convolution operations to compute red pixel values 812, blue pixel values 814 and green pixel values 815. It should be understood that particular processing stages and feature layers in systems 800 and 900 as shown are merely examples provided for the purpose of illustration, and that other implementations may include greater or fewer processing stages and/or feature layers without deviating from claimed subject matter.

Like in system 800, processing stages 852 and 854 of system 900 may determine sets of kernel coefficients 806 and 808 using a machine-learning process executed by one or more neural networks based, at least in part, on training sets and/or ground truth observations. Prior to application of sets of kernel coefficients 906 and 908, normalization operations 932 and 934 may normalize sets of kernel coefficients 906 and 908. For example, either or both sets of kernel coefficients 906 and 908 may be separable into subplanes. A normalization operation 932 or 934 may normalize kernel coefficients of such a subplane such that kernel coefficients of the subplane sum to a unit value (e.g., one) or a null value (e.g., zero) depending on an associated output channel.

According to an embodiment, a system may process raw pixel values sampled from an imaging device that defines four color channels including an infrared channel according to an embodiment. Such an imaging device may be implemented to include one or more features of an imaging device shown in FIG. 1A. In one aspect, color interpolation, infrared pixel value interpolation and/or clipping management operations may be performed based on application of kernel coefficients derived from machine-learning training operations using one or more normalization operations discussed herein. In a particular implementation, such operations may be performed, in whole or in part, on an integrated circuit device. Such an integrated circuit device may also include and/or be integrated with an imaging device (not shown) to provide image pixel samples for four color channels such as illustrated in FIG. 1A, for example. Raw signals sampled from such an imaging device shown in FIG. 1A may be supplied as input signals from a four-color channel imaging device to provide output signals such as, for example, a Bayer 2×2 output signal, an uncorrected Bayer 2×2 output signal, and an IR output signal. According to an embodiment, an Bayer 2×2 output signal and/or uncorrected Bayer 2×2 output signal may be formatted for processing using legacy methods and/or techniques for processing image pixels values generated by a three-color channel imaging device.

In another aspect, color interpolation, infrared pixel value interpolation and/or clipping management may be performed based, at least in part, on application of kernel coefficients derived from machine-learning training operations using one or more normalization operations discussed herein. For example, such kernel coefficients may be applied to interpolate red and/or blue pixel values to, for example, produce demosaiced pixel values in a reproduced image. In a particular implementation, such kernel coefficients may be computed according to block 302 (FIG. 3) as discussed above.

According to an embodiment, a neural network may comprise a graph comprising nodes to model neurons in a brain. In this context, a "neural network" as referred to herein means an architecture of a processing device defined and/or represented by a graph including nodes to represent neurons that process input signals to generate output signals, and edges connecting the nodes to represent input and/or output signal paths between and/or among the artificial neurons represented by the graph. In particular implementations, a neural network may comprise a biological neural network, made up of real biological neurons, or an artificial neural network, made up of artificial neurons, for solving artificial intelligence (AI) problems, for example. In an implementation, such an artificial neural network may be implemented using one or more computing devices such as computing devices shown in FIG. 10. For example, one or more computing devices of FIG. 10 (e.g., computing device 1802, 1804 and/or 1806) may implement and/or execute a neural network, in whole or in part. In a particular implementation, weights associated with edges to represent input and/or output paths may reflect gains to be applied and/or whether an associated connection between connected nodes is to be excitatory (e.g., weight with a positive value) or inhibitory connections (e.g., weight with negative value). In an example implementation, a neuron may apply a weight to input signals, and sum weighted input signals to generate a linear combination.

Edges in a neural network connecting nodes may model synapses capable of transmitting signals (e.g., represented by real number values) between neurons. Receiving such a signal at a node in a neural network, the node may perform some computation to generate an output signal (e.g., to be provided to another node in the neural network connected by an edge) based, at least in part, on one or more weights and/or numerical coefficients associated with the node and/or edges providing the output signal. In a particular implementation, such weights and/or numerical coefficients may be adjusted and/or updated as learning progresses. For example, such a weight may increase or decrease a strength of an output signal. In an implementation, transmission of an output signal from a node in a neural network may be inhibited if a strength of the output signal does not exceed a threshold value.

According to an embodiment, a neural network may be structured in layers such that a node in a particular neural network layer may receive output signals from one or more nodes in a previous layer in the neural network, and provide an output signal to one or more nodes in a subsequent layer in the neural network. One specific class of layered neural networks may comprise a convolutional neural network (CNN) or space invariant artificial neural networks (SIANN) that enable deep learning. Such CNNs and/or SIANNs may be based on a shared-weight architecture of convolution kernels that shift over input features and provide translation equivariant responses. Such CNNs and/or SIANNs may be applied to image and/or video recognition, recommender systems, image classification, image segmentation, medical image analysis, natural language processing, brain-computer interfaces, financial time series, just to provide a few examples.

In particular implementations, neural networks may enable improved results in a wide range of tasks, including image recognition, speech recognition, just to provide a couple of example applications. To enable performing such tasks, features of a neural network (e.g., nodes, edges, weights, layers of nodes and edges) may be structured and/or configured to form "filters" that may have a measurable/numerical state such as a value of an output signal. Such a filter may comprise nodes and/or edges arranged in "paths" and are to be responsive to sensor observations provided as input signals. In an implementation, a state and/or output signal of such a filter may indicate and/or infer detection of a presence or absence of a feature in an input signal.

According to an embodiment systems 200, 250, 400, 500, 600, 700, 800 and/or 900 may be formed by and/or expressed in transistors and/or lower metal interconnects (not shown) in processes (e.g., front end-of-line and/or back-end-of-line processes) such as processes to form complementary metal oxide semiconductor (CMOS) circuitry, just as an example. It should be understood, however that this is merely an example of how circuitry may be formed in a device in a front end-of-line process, and claimed subject matter is not limited in this respect.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Storage media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer communication networks via one or more data transfer protocols (e.g., HTTP, FTP, SMTP, etc.).

If received within a computer system via one or more machine-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process (e.g., wafer fabrication process).

In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

For one or more embodiments, systems 200, 250, 400, 500, 600, 700, 800 and 900 may be implemented in a device, such as a computing device and/or computer communication networking device, that may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, in-vehicle electronics or advanced driver-assistance systems (ADAS), or any combination of the foregoing. Further, unless specifically stated otherwise, a process as described, such as with reference to flow diagrams and/or otherwise, may also be executed and/or affected, in whole or in part, by a computing device and/or a computer communication network device. A device, such as a computing device and/or computer communication network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

In the context of the present patent application, the term "connection," the term "component" and/or similar terms are intended to be physical but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a computer communication network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term "parameters" (e.g., one or more parameters), "values" (e.g., one or more values), "symbols" (e.g., one or more symbols) "bits" (e.g., one or more bits), "elements" (e.g., one or more elements), "characters" (e.g., one or more characters), "numbers" (e.g., one or more numbers), "numerals" (e.g., one or more numerals) or "measurements" (e.g., one or more measurements) refer to material descriptive of a collection of signals, such as in one or more electronic documents and/or electronic files, and exist in the form of physical signals and/or physical states, such as memory states. For example, one or more parameters, values, symbols, bits, elements, characters, numbers, numerals or measurements, such as referring to one or more aspects of an electronic document and/or an electronic file comprising an image, may include, as examples, time of day at which an image was captured, latitude and longitude of an image capture device, such as a camera, for example, etc. In another example, one or more parameters, values, symbols, bits, elements, characters, numbers, numerals or measurements, relevant to digital content, such as digital content comprising a technical article, as an example, may include one or more authors, for example. Claimed subject matter is intended to embrace meaningful, descriptive parameters, values, symbols, bits, elements, characters, numbers, numerals or measurements in any format, so long as the one or more parameters, values, symbols, bits, elements, characters, numbers, numerals or measurements comprise physical signals and/or states, which may include, as parameter, value, symbol bits, elements, characters, numbers, numerals or measurements examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a communication network, where a node may comprise one or more computer communication network devices and/or one or more computing devices, for example. As an illustrative example, but without limitation, a node may comprise one or more sites employing a local network address, such as in a local network address space. Likewise, a device, such as a computer communication network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local computer communication network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a computer communication network path of computer communication network nodes to the target and/or destination address. Although the Internet and/or the Web comprise a computer communication network of interoperable computer communication networks, not all of those interoperable networks are necessarily available and/or accessible to the public. According to an embodiment, a signal packet and/or frame may comprise all or a portion of a "message" transmitted between devices. In an implementation, a message may comprise signals and/or states expressing content to be delivered to a recipient device. For example, a message may at least in part comprise a physical signal in a transmission medium that is modulated by content that is to be stored in a non-transitory storage medium at a recipient device, and subsequently processed.

In the context of the particular patent application, a computer communication network protocol, such as for communicating between devices of a computer communication network, may be characterized, at least in part, substantially in accordance with a layered description, such as the so-called Open Systems Interconnection (OSI) seven layer type of approach and/or description. A computer communication network and/or communications protocol (also referred to as a computer communication network protocol) refers to a set of signaling conventions, such as for communication transmissions, for example, as may take place between and/or among devices in a computer communication network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A computer communication network protocol, such as protocols characterized substantially in accordance with the aforementioned OSI description, has several layers. These layers are referred to as a computer communication network stack. Various types of communications (e.g., transmissions), such as computer network communications, may occur across various layers. A lowest level layer in a computer communication network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a computer communication network protocol stack, additional operations and/or features may be available via engaging in communications that are substantially compatible and/or substantially compliant with a particular computer communication network protocol at these higher-level layers. For example, higher-level layers of a computer communication network protocol may, for example, affect device permissions, user permissions, etc.

Figure 10:
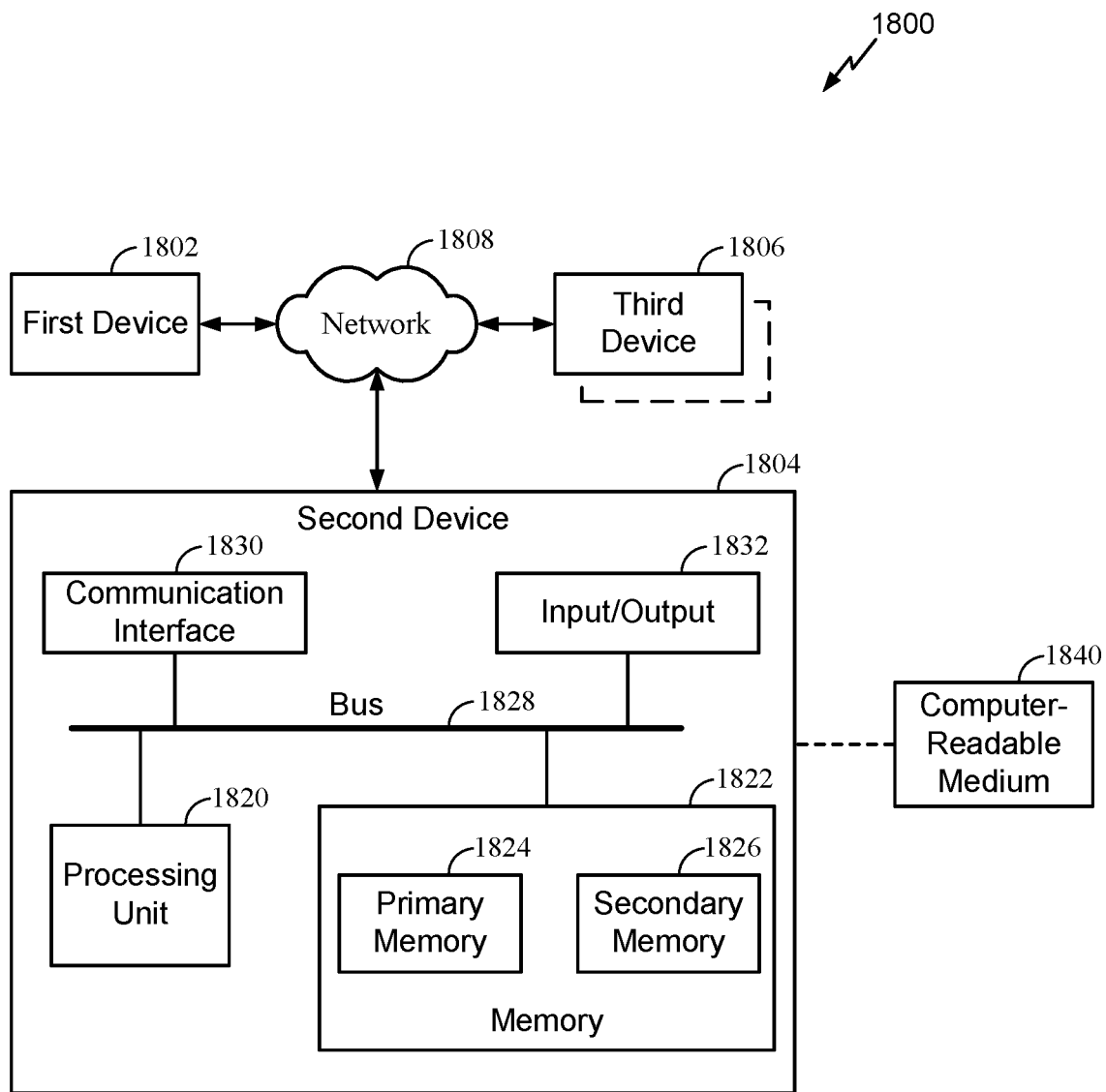
FIG. 10 is a schematic block diagram of an example computing system in accordance with an implementation.

In one example embodiment, as shown in FIG. 10, a system embodiment may comprise a local computer communication network (e.g., device 1804 and medium 1840) and/or another type of network, such as a computing and/or communications network. For purposes of illustration, therefore, FIG. 10 shows an embodiment 1800 of a system that may be employed to implement either type or both types of computer communication networks. Network 1808 may comprise one or more network connections, links, processes, services, applications, and/or resources to facilitate and/or support communications, such as an exchange of communication signals, for example, between a computing device, such as 1802, and another computing device, such as 1806, which may, for example, comprise one or more client computing devices and/or one or more server computing device. By way of example, but not limitation, network 1808 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 10 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor" and/or "processing circuit" for example, is understood to connote a specific structure such as a central processing unit (CPU), digital signal processor (DSP), image signal processor (ISP), graphics processing unit (GPU) and/or neural network processing unit (NPU), or a combination thereof, of a computing device which may include a control unit and an execution unit. In an aspect, a processor and/or processing circuit may comprise a device that fetches, interprets and executes instructions to process input signals to provide output signals. As such, in the context of the present patent application at least, this is understood to refer to sufficient structure within the meaning of 35 USC § 112 (f) so that it is specifically intended that 35 USC § 112 (f) not be implicated by use of the term "computing device," "processor," "processing unit," "processing circuit" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIG. 2 through FIG. 9 and in the text associated with the foregoing figure(s) of the present patent application.

Referring now to FIG. 10, in an embodiment, first and third devices 1802 and 1806 may be capable of rendering a graphical user interface (GUI) for a network communication device and/or a computing device, for example, so that a user-operator may engage in system use. Device 1804 may potentially serve a similar function in this illustration. Likewise, in FIG. 10, computing device 1802 ('first device' in figure) may interface with computing device 1804 ('second device' in figure), which may, for example, also comprise features of a client computing device and/or a server computing device, in an embodiment. Processor (e.g., processing device) 1820 and memory 1822, which may comprise primary memory 1824 and secondary memory 1826, may communicate by way of a communication bus 1815, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 1804, as depicted in FIG. 10, is merely one example, and claimed subject matter is not limited in scope to this particular example. FIG. 10 may further comprise a communication interface 1830 which may comprise circuitry and/or devices to facilitate transmission of messages between second device 1804 and first device 1802 and/or third device 1806 in a physical transmission medium over network 1808 using one or more network communication techniques identified herein, for example. In a particular implementation, communication interface 1830 may comprise a transmitter device including devices and/or circuitry to modulate a physical signal in physical transmission medium according to a particular communication format based, at least in part, on a message that is intended for receipt by one or more recipient devices. Similarly, communication interface 1830 may comprise a receiver device comprising devices and/or circuitry demodulate a physical signal in a physical transmission medium to, at least in part, recover at least a portion of a message used to modulate the physical signal according to a particular communication format. In a particular implementation, communication interface may comprise a transceiver device having circuitry to implement a receiver device and transmitter device.

For one or more embodiments, a device, such as a computing device and/or computer communication networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a computer communication network device. A device, such as a computing device and/or computer communication network device, may vary in terms of capabilities and/or features. Claimed subject matter is intended to cover a wide range of potential variations.

In FIG. 10, computing device 1802 may provide one or more sources of executable computer instructions in the form physical states and/or signals (e.g., stored in memory states), for example. Computing device 1802 may communicate with computing device 1804 by way of a computer communication network connection, such as via network 1808, for example. As previously mentioned, a connection, while physical, may not necessarily be tangible. Although computing device 1804 of FIG. 10 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1822 may comprise any non-transitory storage mechanism. Memory 1822 may comprise, for example, primary memory 1824 and secondary memory 1826, additional memory circuits, mechanisms, or combinations thereof may be used. Memory 1822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1822 may be utilized to store a program of executable computer instructions. For example, processor 1820 may fetch executable instructions from memory and proceed to execute the fetched instructions. Memory 1822 may also comprise a memory controller for accessing device readable-medium 1840 that may carry and/or make accessible digital content, which may include code, and/or instructions, for example, executable by processor 1820 and/or some other device, such as a controller, as one example, capable of executing computer instructions, for example. Under direction of processor 1820, a non-transitory memory, such as memory cells storing physical states (e.g., memory states), comprising, for example, a program of executable computer instructions, may be executed by processor 1820 and able to generate signals to be communicated via a computer communication network, for example, as previously described. Generated signals may also be stored in memory, also previously suggested.

Memory 1822 may store electronic files and/or electronic documents, such as relating to one or more users, and may also comprise a computer-readable medium that may carry and/or make accessible content, including code and/or instructions, for example, executable by processor 1820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, samples, observations, weights, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or computer communication network device. In the context of this specification, therefore, a special purpose computer and/or a similar special purpose computing and/or computer communication network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or computer communication network device. In the context of this particular patent application, as mentioned, the term "specific apparatus" therefore includes a general purpose computing and/or computer communication network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 10, processor 1820 may comprise one or more circuits, such as digital circuits, to perform at least a portion of a computing procedure and/or process. By way of example, but not limitation, processor 1820 may comprise one or more processors, such as controllers, microprocessors, microcontrollers, application specific integrated circuits, digital signal processors (DSPs), graphics processing units (GPUs), neural network processing units (NPUs), programmable logic devices, field programmable gate arrays, the like, or any combination thereof. In various implementations and/or embodiments, processor 1820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 10 also illustrates device 1804 as including a component 1832 operable with input/output devices, for example, so that signals and/or states may be appropriately communicated between devices, such as device 1804 and an input device and/or device 1804 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:
   determining coefficients for implementing a kernel to be applied to pixel values derived, at least in part, from pixel signals of an imaging array to interpolate pixel values for a multi color channel imaging system, the coefficients to being determined based at least in part, on training operations, wherein:
   the kernel is partitionable into a plurality of sub arrays, each sub array to map pixel values to pixel values of a color channel associated with the sub array such that:
   a sum of coefficients of a first sub array of the plurality of sub arrays to map pixel values of a particular color channel substantially equals a first predetermined value; and
   a sum of coefficients of at least one other sub array of the plurality of sub arrays to map pixel values of at least one remaining color channel other than the particular color channel substantially equals a second predetermined value.

2. The method of claim 1, wherein the coefficients are determined based, at least in part, on a back propagation operation to adjust one or more weights associated with nodes in a neural network according to a loss function.

3. The method of claim 1, wherein:
   the
   the first predetermined value comprises a unit value; and
   the second predetermined value comprises a null value.

4. The method of claim 1, and further comprising:
   mapping input pixel signals of the imaging array to one or more arrays of pixel signal values spatially set off from positions of the input pixel signals;
   applying the kernel to the input pixel signals to provide a first component of demosaiced pixel signal values for the particular color channel;
   applying the kernel to at least one of the one or more arrays of pixel signal values that are spatially set off from positions of the input pixel signals to provide at least a second component of demosaiced pixel signal values for the particular color channel; and
   combining the first and second components of the demosaiced pixel signal values for the particular color channel.

5. The method of claim 1, wherein the coefficients are determined based at least in part, on machine learning operations applied to a neural network (NN), and wherein the NN comprises a convolutional neural network (CNN) comprising:
   one or more filter paths to detect and/or classify image features other than pixel values for color channels; and
   wherein coefficients of the kernel are further determined based, at least in part, on a back propagation operation to adjust one or more weights associated with one or more nodes of the CNN in at least one of the one or more filter paths according to a loss function.

6. The method of claim 5, wherein the kernel is adapted to map input pixel values at a first resolution to output pixel values at a second resolution higher than the first resolution.

7. The method of claim 1, wherein:
   determining the coefficients for implementing the kernel comprises determining coefficients to be applied to pixel values at two or more filter stages of stages of a filtering network.

8. The method of claim 7, wherein
   the first predetermined value comprises a unit value; and
   the second predetermined value comprises a null value.

9. A computing device, comprising:
   one or more memory devices; and
   one or more processors, the one or more processors to be coupled to the one or more memory devices, to:
   determine coefficients to implement a kernel to be applied to pixel values derived, at least in part, from pixel signals of an imaging array for interpolation of pixel values for a multi color channel imaging system, the coefficients to be determined based at least in part, on training operations, wherein:
   the kernel to be partitionable into a plurality of sub arrays, each sub array to map pixel values to pixel values of a color channel associated with the sub array such that:
   a sum of coefficients of a sub array to map pixel values of a particular color channel substantially to equal a first predetermined value; and
   a sum of coefficients of at least one of one or more sub arrays to map pixel values of at least one remaining color channel other than the particular color channel substantially to equal a second predetermined value.

10. The computing device of claim 9, the coefficients to be determined based, at least in part, on a back propagation operation to adjust one or more weights associated with nodes in a neural network according to a loss function.

11. The computing device of claim 9, wherein:
the
first predetermined value comprises a unit value; and
the second predetermined value comprises a null value.

12. The computing device of claim 9, wherein the one or more processors are further to:
map input pixel signals of the imaging array to one or more arrays of pixel signal values spatially set off from positions of the input pixel signals;
apply the kernel to the input pixel signals to provide a first component of demosaiced pixel signal values for the particular color channel;
apply the kernel to at least one of the one or more arrays of pixel signal values that are spatially set off from positions of the input pixel signals to provide at least a second component of demosaiced pixel signal values for the particular color channel; and
combine the first and second components of the demosaiced pixel signal values for the particular color channel.

13. The computing device of claim 9, wherein the coefficients to be determined based at least in part, on machine learning operations applied to a neural network (NN), and wherein the NN to comprise a convolutional neural network (CNN) to have:
one or more filter paths to detect and/or classify image features other than pixel values for color channels; and
wherein coefficients of the kernel are further to be determined based, at least in part, on a back propagation operation to adjust one or more weights associated with one or more nodes of the CNN in at least one of the one or more filter paths according to a loss function.

14. The computing device of claim 13, wherein the kernel to be adapted to map input pixel values at a first resolution to output pixel values at a second resolution higher than the first resolution.

15. The computing device of claim 9, wherein the coefficients for implementing the kernel to be applicable to pixel values at two or more filter stages of stages of a filtering network.

16. The computing device of claim 15, wherein
the first predetermined value comprises a unit value; and
the second predetermined value comprises a null value.

17. A method comprising:
applying coefficients of a kernel to pixel values derived, at least in part, from pixel signals of an imaging array for interpolation of pixel values for a multi color channel imaging system, the coefficients being determined based, at least in part, on machine learning operations applied to a neural network (NN), wherein:
the kernel to is partitionable into a plurality of sub arrays, each sub array to map pixel values to pixel values of a color channel associated with the sub array such that:
a sum of coefficients of a sub array to map pixel values of a particular color channel substantially to equal a first predetermined value; and
a sum of coefficients of at least one of one or more sub arrays to map pixel values of at least one remaining color channel other than the particular color channel substantially to equal a second predetermined value.

18. The method of claim 17, wherein:
the
first predetermined value comprises a unit value; and
the second predetermined value comprises a null value.

19. The method of claim 17, wherein the coefficients are determined based at least in part, on machine learning operations applied to a neural network (NN), and wherein the NN to comprise a convolutional neural network (CNN) to have:
one or more filter paths to detect and/or classify image features other than pixel values for color channels; and
wherein coefficients of the kernel are further to be determined based, at least in part, on a back propagation operation to adjust one or more weights associated with one or more nodes of the CNN in at least one of the one or more filter paths according to a loss function.

20. The method of claim 17, wherein the coefficients are determined based at least in part, on machine learning operations applied to a neural network (NN), and wherein the NN to comprise a convolutional neural network (CNN) to have:
one or more filter paths to detect and/or classify image features other than pixel values for color channels; and
wherein coefficients of the kernel are further to be determined based, at least in part, on a back propagation operation to adjust one or more weights associated with one or more nodes of the CNN in at least one of the one or more filter paths according to a loss function.

\* \* \* \* \*